United States Patent Office 3,253,960
Patented May 31, 1966

3,253,960
ADDITIVES FOR DRY CELLS
Hugh F. Schaefer, Lakewood, Ohio, assignor to Union Carbide Corporation, a corporation of New York
No Drawing. Filed Apr. 2, 1964, Ser. No. 356,970
15 Claims. (Cl. 136—107)

This invention relates to improvements in Leclanché type dry cells and more particularly to the prevention of gas formation in such cells.

The conventional Leclanché cell consists of a zinc anode, an electrolyte wet cathode of manganese dioxide, a separator located between the anode and the cathode, and a current collector associated with the cathode. The electrolyte which is a solution of ammonium chloride and zinc chloride permeates the depolarizer material and the separator and contacts the anode. The action of the electrolyte on the zinc anode even when the cell is not in service, results in local electrolytic action and causes corrosion to take place on the zinc anode. Such corrosion reduces the shelf life of the cell and results in the generation of gas within the cell. The accumulation of substantial amounts of gas within the cell is particularly noticeable when the cell is used under what are termed abuse or severe conditions. The existence of excessive gas pressure within the cell usually results in distortion of the cell structure, disruption of liquid-tight seals, leakage of corrosive electrolyte, and occasionally actual rupture of the cell container.

It is the primary object of this invention to preserve the structural integrity of the cell by suppressing the formation of gas within the cell.

This and other related objects are achieved by incorporating within the cell a gas suppressing amount of at least one compound selected from the group of compounds comprising acridine, beta-dinitro-diphenylamine sulfoxide, 2-chloro, 5-nitropyridine, 4-ethoxy, 2-nitroacetanilide, terephthalonitrile, malonanilide, tribenzylamine, diphenylacetonitrile, triphenylchloromethane, 1,3-diphenoxypropane, and 1,3-dihydroxyisoquinoline. Specifically it has been discovered that these compounds function to suppress the formation of gas within a Leclanché cell particularly during periods of severe use.

These compounds, which have been found to be excellent, are incorporated in the cell cathode, preferably by impregnation of the carbon rod employed as the cathode current collector. Incorporation in the carbon rod may be accomplished by any suitable means, e.g., by vapor impregnation, or by solvent impregnation. The material with which the carbon rod is to be impregnated can conveniently be dissolved in a solution and the rod immersed in the resulting solution. After the rod has absorbed a sufficient amount of solution the solvent is evaporated off and the treated rod is inserted into the cathode. Among the suitable solvents are pyridine, chloroform, and N,N-dimethylformamide.

The herein disclosed materials are employed in a gas suppressing amount, i.e., an amount which is sufficient to substantially prevent the evolution of gas. In general, from about 3 to about 5 weight percent based on the weight of the carbon rod is found to provide satisfactory suppression of gas evolution. Under certain conditions sufficient protection can be obtained through the use of less than 3 percent of the selected gas suppressing compound and under other conditions more than 5 weight percent may be required.

Table I illustrates the performance of a series of cells including fresh cells and cells which had been stored for 3 months, comprising the herein disclosed additives in comparison with untreated control cells. In preparing these cells about 0.2 gram of the selected compound was dissolved in a few milliliters of a suitable solvent as indicated in the footnote. A standard D-size carbon rod was immersed in the solution overnight and allowed to absorb the solution. The solvent was removed under vacuum and the rods were dried and then incorporated in standard D-size cells.

TABLE I.—CHARACTERISTICS OF CELLS CONTAINING GAS SUPPRESSING COMPOUNDS

| Organic Additive [1] | Fresh Cells (Mix No. 1) | | | | Cells Stored Three Mos. at 45° C. | | |
|---|---|---|---|---|---|---|---|
| | Short-Circuit Amperes | Ampere-Minutes Service on 2.25 Ohm Continuous Drain to 0.90 v. Cutoff | Abuse Gassing | | Appearance of Cells after Room Temperature Storage For 7 months | Short-Circuit Amperes (Mix 1) | Short-Circuit Amperes (Mix 2) |
| | | | Cc. of gas/day | Days Test Period | | | |
| β-dinitrodiphenylamine Sulfoxide | 5.5–6.0 | 69–70 | 2.8 | 87 | Same as the Control | 4.0 | 4.0 |
| Acridine | 5.0–6.5 | 70–72 | 3.5–4.5 | 28 | do | 4.0 | 4.5 |
| 2-chloro, 5-nitropyridine | 4.0–6.5 | 64–71 | 2.7–3.3 | 86 | do | 4.0 | 4.3 |
| Tribenzylamine | 6.5–7.0 | 73–75 | 3.7–5.5 | 39 | do | 2.5 | 4.8 |
| Diphenylacetonitrile | 6.5 | 70–73 | 3.6–5.5 | 34 | do | 4.5 | 5.0 |
| Triphenylchloromethane | 6.5–7.0 | 71–73 | 3.9 | 77 | do | 4.0 | 5.0 |
| 1,3-dihydroxy isoquinoline | 6.5 | 69–75 | 3.5 | 58 | do | 4.0 | 4.5 |
| Control | 6.0–7.0 | 65–77 | 8.6–18.3 | 29 | do | 4.0 | 5.0 |
| 4-ethoxy-2-nitroacetanilide | 7.4–7.6 | 69–73 | 3.9–4.8 | 8 | do | 4.0 | 5.0 |
| Terephthalonitrile | 8.2 | 72–74 | 3.9–6.9 | 10 | do | 4.0 | 5.0 |
| Malonanilide | 5.6 | 63–67 | 2.4–4.1 | 23 | do | 4.0 | 5.0 |
| 1,3-diphenoxypropane | 8.1 | 72–73 | 3.5–6.3 | 9 | do | 4.5 | 5.1 |

[1] Solvents used to impregnate rods with these compounds were as follows:
Compound No. 1—pyridine, Compounds Nos. 2–6—chloroform, Compound No. 7—N,N-dimethylformamide.

These materials function in substantially identical fashion to prevent excessive gas evolution within the cell both during continuous discharge and during long term storage, even at temperatures as high as 45° C. Further, this above stated advantage is achieved without any substantial deleterious effects on the cell service characteristics, shelf life or appearance. The tests show that the performance of cells treated with the herein disclosed compounds was comparable to the performance of the untreated control cells. Gas evolution, however, was considerably reduced particularly under abuse conditions. Freshly prepared cells containing the compounds of this invention were found to give service, on a continuous 2.25 ohm discharge, which was equivalent to that of control cells containing no gas suppressing compounds. The initial short circuit amperage of the cells was generally equivalent to that of the control cells both initially and after a period of prolonged storage. Gas evolution in discharged cells which had been shorted by a 2.25 ohm load was considerably lower for the treated cells than from the untreated control cells after a period of thirty days. No perforation, leakage or distortion of the treated cells was observed.

The abuse gassing tests were carried out in the following manner. After service on a 2.25 ohm continuous drain was measured, the cells were shorted across a 2.25 ohm resistance and placed in the upper end of a volume calibrated glass tube which was subsequently inverted in an oil bath. The oil was drawn up into the tube to about one half an inch below the cell. Gas evolution from the vented cell then forced the oil down and the volume of gas evolved could be measured directly in the calibrated tube.

What is claimed is:

1. A primary cell comprising a zinc anode, a manganese dioxide cathode-depolarizer, a carbon current collector, a separator, an ammonium chloride-zinc chloride electrolyte and a compound selected from the group consisting of acridine; beta-dinitro-diphenylamine sulfoxide; 2-chloro, 5-nitropyridine; 4-ethoxy, 2 nitroacetanilide; terephthalonitrile; malonanilide; tribenzylamine; diphenylacetonitrile, triphenylchloromethane; 1,3-diphenoxypropane; and 1,3-dihydroxyisoquinoline.

2. In combination in a primary cell, a zinc anode, an electrolyte wet manganese dioxide depolarizer, a carbon current collector and gas suppressing means consisting of at least one compound selected from the group consisting of acridine; beta-dinitro-diphenylamine sulfoxide; 2-chloro, 5-nitropyridine; 4-ethoxy, 2 nitroacetanilide; terephthalonitrile; malonanilide; tribenzylamine; diphenylacetonitrile, triphenylchloromethane; 1,3-diphenoxypropane; and 1,3-dihydroxyisoquinoline.

3. In combination in a primary cell, a zinc anode, an electrolyte wet manganese dioxide depolarizer, and a carbon current collector impregnated with a gas suppressing amount of at least one compound selected from the group consisting of acridine; beta-dinitro-diphenylamine sulfoxide; 2-chloro, 5-nitropyridine; 4-ethoxy, 2 nitroacetanilide; terephthalonitrile; malonanilide; tribenzylamine; diphenylacetonitrile, triphenylchloromethane; 1,3-diphenoxypropane; and 1,3-dihydroxyisoquinoline.

4. In combination in a primary cell, a zinc anode, an ammonium chloride-zinc chloride electrolyte, an electrolyte wet manganese dioxide depolarizer, and a carbon current collector containing from about 3 to about 5 weight percent, based on the weight of the cathode collector of at least one gas suppressing compound selected from the group consisting of acridine; beta-dinitro-diphenylamine sulfoxide; 2-chloro, 5-nitropyridine; 4-ethoxy, 2 nitroacetanilide; terephthalonitrile; malonanilide; tribenzylamine; diphenylacetonitrile, triphenylchloromethane; 1,3-diphenoxypropane; and 1,3-dihydroxyisoquinoline.

5. In combination in a primary cell, a zinc anode, an ammonium chloride-zinc chloride electrolyte, an electroylte wet manganese dioxide depolarizer, and a carbon cathode collector impregnated with from about 3 to about 5 weight percent of acridine.

6. In combination, in a primary cell, a zinc anode, an ammonium chloride-zinc chloride electrolyte, an electrolyte wet manganese dioxide depolarizer, and a carbon current collector impregnated with from about 3 to about 5 weight percent of beta-dinitro-diphenylamine sulfoxide.

7. In combination in a primary cell, a zinc anode, an ammonium chloride-zinc chloride electrolyte, an electrolyte wet manganese dioxide depolarizer, and a carbon current collector imperginated with from about 3 to about 5 weight percent of 2-chloro, 5-nitropyridine.

8. In combination in a primary cell, a zinc anode, an ammonium chloride-zinc chloride electrolyte, an electrolyte wet manganese dioxide depolarizer, and a carbon current collector impregnated with from about 3 to about 5 weight percent of 4-ethoxy, 2-nitroacetanilide.

9. In combination in a primary cell, a zinc anode, an ammonium chloride-zinc chloride electrolyte, an electrolyte wet manganese dioxide depolarizer, and a carbon current collector impregnated with from about 3 to about 5 weight percent of terephthalonitrile.

10. In combination in a primary cell, a zinc anode, an ammonium chloride-zinc chloride electrolyte, an electrolyte wet manganese dioxide depolarizer, and a carbon current collector impregnated with from about 3 to about 5 weight percent of malonanilide.

11. In combination in a primary cell, a zinc anode, an ammonium chloride-zinc chloride electrolyte, an electrolyte wet manganese dioxide depolarizer, and a carbon current collector impregnated with from about 3 to about 5 weight percent of tribenzylamine.

12. In combination in a primary cell, a zinc anode, an ammonium chloride-zinc chloride electrolyte, an electrolyte wet manganese dioxide depolarizer, and a carbon current collector impregnated with from about 3 to about 5 weight percent of diphenylacetonitrile.

13. In combination in a primary cell, a zinc anode, an ammonium chloride-zinc chloride electrolyte, an electrolyte wet manganese dioxide depolarizer, and a carbon current collector impregnated with from about 3 to about 5 weight percent of triphenylchloromethane.

14. In combination in a primary cell, a zinc anode, an ammonium chloride-zinc chloride electroylte, an electrolyte wet manganese dioxide depolarizer, and a carbon current collector impregnated with from about 3 to about 5 weight percent of 1,3-diphenoxypropane.

15. In combination in a primary cell, a zinc anode, an ammonium chloride-zinc chloride electrolyte, an electrolyte wet manganese dioxide depolarizer, and a carbon current collector impregnated with from about 3 to about 5 weight percent of 1,3-dihydroxyisoquinoline.

References Cited by the Applicant

UNITED STATES PATENTS 2,897,250  7/1959  E. M. Klopp.

OTHER REFERENCES

Morehouse, Hamer and Vinal, J. Research of Bureau of Standards, vol. 40, February 1948, pp. 151–161.

WINSTON A. DOUGLAS, *Primary Examiner.*